(12) United States Patent
Harvey (10) Patent No.: US 10,316,874 B2
(45) Date of Patent: Jun. 11, 2019

(54) COVER PANEL CLIP

(71) Applicant: Colorado Lining International, Inc., Parker, CO (US)

(72) Inventor: Andre Alan Harvey, Spring Valley, CA (US)

(73) Assignee: Raven Industries, Inc., Sioux Falls, SD (US)

( * ) Notice: Subject to any disclaimer, the term of this patent is extended or adjusted under 35 U.S.C. 154(b) by 43 days.

(21) Appl. No.: 15/642,552

(22) Filed: Jul. 6, 2017

(65) Prior Publication Data

US 2017/0306997 A1  Oct. 26, 2017

Related U.S. Application Data

(63) Continuation of application No. 14/508,112, filed on Oct. 7, 2014, now Pat. No. 9,702,387.

(60) Provisional application No. 61/890,965, filed on Oct. 15, 2013.

(51) Int. Cl.
*F16B 5/06* (2006.01)
*F16B 2/22* (2006.01)
*B65D 88/36* (2006.01)

(52) U.S. Cl.
CPC ............ *F16B 5/0621* (2013.01); *B65D 88/36* (2013.01); *F16B 2/22* (2013.01); *Y10T 24/3924* (2015.01); *Y10T 24/44932* (2015.01); *Y10T 29/49945* (2015.01)

(58) Field of Classification Search
CPC .. F16B 5/0621; F16B 2/08; F16B 2/10; F16B 2/06; F16B 2/22; F16B 2/20; Y10T 24/44239; Y10T 24/4453; Y10T 24/44983; Y10T 24/44923; Y10T 24/3924; Y10T 24/49945; Y10T 29/49945; Y10T 24/45581; F16L 3/13; F16L 3/133; F16L 3/127; F16L 3/1211; B65D 88/36
USPC ............................................ 248/62, 63, 74.2
See application file for complete search history.

(56) References Cited

U.S. PATENT DOCUMENTS

| | | |
|---|---|---|
| 4,079,484 A | 3/1978 | Nakama |
| 5,435,026 A | 7/1995 | Cavazos |
| 5,845,883 A * | 12/1998 | Meyer .................. F16B 19/004 248/73 |
| 6,257,530 B1 | 7/2001 | Tsai |
| 6,354,543 B1 | 3/2002 | Paske |
| 6,536,084 B2 | 3/2003 | Davis |
| 2015/0101150 A1 | 4/2015 | Harvey |

FOREIGN PATENT DOCUMENTS

FR  2922691 A1 *  4/2009 ......... B60R 16/0215

* cited by examiner

*Primary Examiner* — Jack W Lavinder
(74) *Attorney, Agent, or Firm* — Holzer Patel Drennan (57) ABSTRACT

A clip for securing one or more cover panels within a containment structure includes an annular portion partially-enclosing an internal space and two compressible legs adjoining opposite ends of the central portion. The clip further includes a clasp with first and second securing tabs configured to fixedly secure an object within the internal space and apply an outward force on the compressible legs.

20 Claims, 8 Drawing Sheets

Slide an elongated object between compressible legs of a clip and into an a space partially enclosed by the clip
805

↓

Compress legs of the clip toward one another
810

↓

While the legs of the clip are compressed, insert the legs through an aperture in an object
815

↓

Release legs and allow the legs to expand within the aperture so that a latching mechanism engages the object
820

↓

Secure the object by applying a downward force on the elongated object toward the legs of the clip
825

FIG. 8

COVER PANEL CLIP

CROSS-REFERENCE TO RELATED APPLICATIONS

The present application is a continuation application of U.S. patent application Ser. No. 14/508,112, issued as U.S. Pat. No. 9,702,387, entitled "Cover Panel Clip" and filed on Oct. 7, 2014, which further claims benefit of priority to U.S. Provisional Patent Application No. 61/890,965 entitled "Cover Panel Clip" and filed on Oct. 15, 2013. Both of these applications are specifically incorporated by reference for all that they disclose or teach.

BACKGROUND

Large containment structures, such as those commonly used to store quantities of petroleum, waste, water, etc., may be used in combination with rigid, semi-rigid floating covers. These containment structure covers can be single panel structures or multi-panel structures. Some systems including multi-panel structures require precise positioning of individual panels relative to one another to achieve a desired coverage. Individual panels can be large, difficult to position within a storage tank, prone to shifting, and vulnerable to displacement by wind.

SUMMARY

Implementations described herein provide clip structures, systems, and methods for securing one or more cover panels within a containment structure. In one implementation, a clip includes two compressible legs adjoining opposite ends of a central portion partially-enclosing an internal space. The clip further includes a clasp with first and second securing tabs. When engaged, the clasp fixedly secures an object within the internal space and supplies an outward force on the compressible legs.

This Summary is provided to introduce an election of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

DETAILED DESCRIPTIONS

Figure 1:
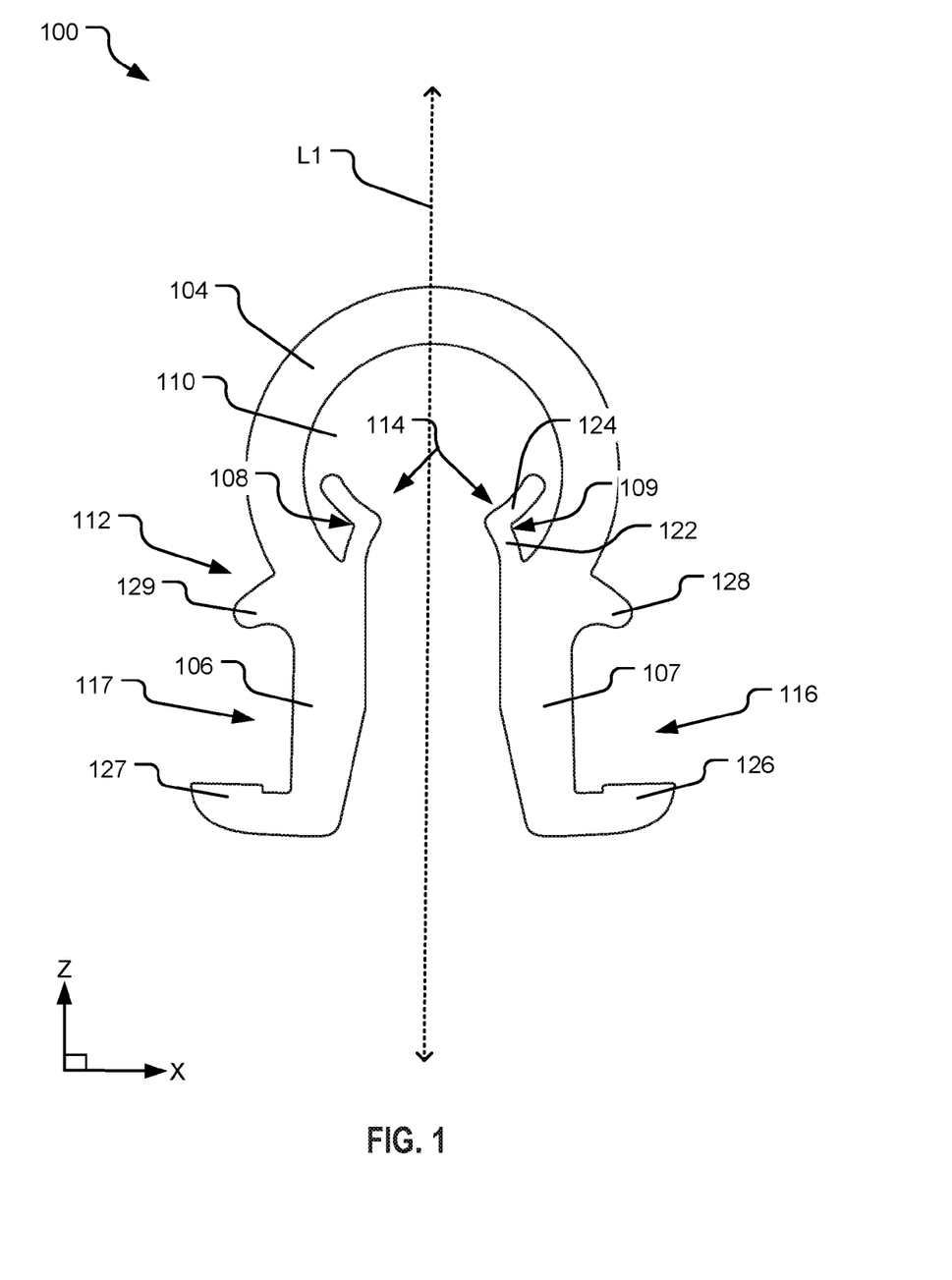
FIG. 1 illustrates an example clip for securing one or more cover panels within a containment structure cover system.

FIG. 1 illustrates an example clip 100 for securing one or more cover panels within a containment structure cover system. The cover clip 100 has a central portion 104 with opposite ends that respectively adjoin one of two compressible legs 106 and 107. In the absence of applied force, the compressible legs 106 and 107 are substantially parallel (e.g., within +/−5 degrees) of one another. In one implementation, an elongated object (e.g., a cable, rope, rod, bungee, wire, strap, webbing, etc.) is threaded through the central portion 104. The compressible legs 106 and 107 of the clip 100 are inserted, under a compression force, through an aperture forming an attachment point in another object. The following description details various features of the clip 100 that provide for secure coupling of the clip 100 to the attachment point.

The implementations disclosed herein are generally described with respect to containment structure storage systems and secure positioning of cover panels within containment structures. However, the disclosed technology is contemplated for use in other fields including some applications unrelated to containment and storage, including a variety of applications for which it is useful to securely couple objects together.

In FIG. 1, the central portion 104 defines an internal space 110 and is shown to have an annular shape; however, a variety of a shapes are contemplated for such purpose including for example, rectangular, triangular, parabolic, non-traditional shape, etc. Each of the compressible legs 106 and 107 of the clip 100 includes a latching mechanism (e.g., latching mechanisms 116 and 117, respectively) on an outward-facing surface. As used herein, "outward-facing surface" of a clip refers to a surface facing away from a center longitudinal axis L1 of the clip (e.g., the clip 100). For example, an outward-facing surface of the compressible leg 106 is the surface that faces away from the opposing compressible leg 107.

Each of the latching mechanisms 116, 117 includes an endpoint protrusion (e.g., endpoint protrusions 126, 127) and a midpoint protrusion (e.g., midpoint protrusions 128, 129) separated by a distance along a length of a corresponding compressible leg 106 or 107. In one implementation, the latching mechanisms 116 and 117 provide resistance to vertical (e.g., z-direction) motion of an object positioned to encircle the compressible legs 106 and 107.

The clip 100 further includes a clasping mechanism 114 configured to fixedly secure an object such as a cable, wire, rope, etc. into a position within the internal space 110. As used herein, "fixedly securing" an object means that the object cannot readily move from a secured position. A variety of types of clasping mechanisms may be suitable for use in various implementations; however, the clasping mechanism 114 includes a first securing tab 108 and a second securing tab 109 protruding from opposite sides of a neck portion 112 of the clip 100 and into the internal space 110.

Each of the first securing tab 108 and the second securing tab 109 includes a first portion (e.g., a first portion 122) and a second portion (e.g., a second portion 124). The first portion 122 adjoins the neck portion 112 of the clip 100 at a first end and connects, at an opposite end, to the second portion 124. The second portion 124 is angled relative to the corresponding first portion 122 so that a free end of the second portion 124 points away from a longitudinal axis L1 of the clip 100.

In one implementation, the clasping mechanism 114 can be engaged to fixedly secure an elongated object (e.g., a cable) and incidentally apply an outward force on the compressible legs 106 and 107. As used herein, an "outward force" is a force that is directionally away from and substantially perpendicular to the longitudinal axis L1 of a clip (e.g., the clip 100). As described in greater detail below, the outward force applied via engagement of the clasping mechanism 114 tightens a coupling between the clip 100 and an adjacent object encircling the compressible legs 106 and 107.

In other implementations, the clip 100 may include features in addition to or in lieu of one or more features illustrated in FIG. 1. In one implementation, the latching mechanisms 116 and 117 do not include the midpoint protrusions (e.g., the midpoint protrusions 128, 129). Still other implementations do not include the clasping mechanism 114.

Figure 2:
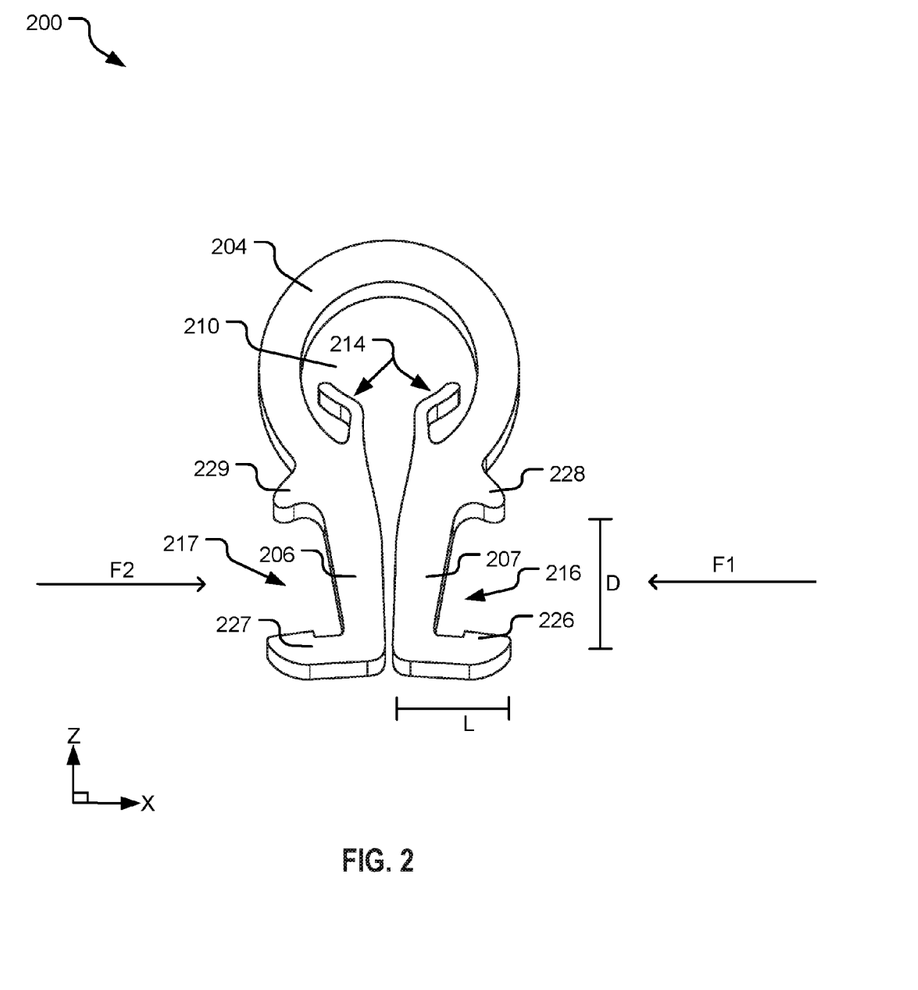
FIG. 2 illustrates an example clip under an applied force prior to insertion of the clip into a cover panel of a containment structure cover system.

FIG. 2 illustrates an example clip 200 under an applied compression force (e.g., a net force of F1 and F2) prior to insertion into a cover panel (not shown) of a containment structure cover system. The clip 200 includes compressible legs 206 and 207 that each adjoins to opposite ends of a central portion 204. The central portion 204 defines an internal space 210 sized to receive an elongated object, such as a cable.

Each of the compressible legs 206 and 207 of the clip 200 further includes a latching mechanism (e.g., latching mechanisms 216 and 217) on an outward-facing surface. The latching mechanisms 216 and 217 each include a midpoint protrusion 228 or 229 and an endpoint protrusion 226 or 227. The midpoint protrusions 228 and 229 and endpoint protrusions 226 and 227 are shown slightly curved so as to "hook" over an edge of an adjacent object. In other implementations, one or both of the midpoint protrusions 228, 229 and the endpoint protrusions 226, 227 are substantially flat (e.g., in the x-direction), or angled in the x-z plane rather than curved.

Each midpoint protrusion is separated from a corresponding endpoint protrusion by a distance 'D' along a length of a corresponding compressible leg 206 or 207. In one implementation, the distance "D" is about or slightly greater than about 0.5 inches. Depending on the desired application of the clip 200, a variety of other lengths are also contemplated.

In FIG. 2, the x-direction length "L" of each of the endpoint protrusions 226 and 227 is greater than an x-direction length of the midpoint protrusions 228 and 229. Longer endpoint protrusions 226 and 227 help to stabilize and fixedly secure the clip 200 to an object encircling the clip 200 (as discussed in greater detail below). In one implementation, the x-direction length L of the endpoint protrusions 226 and 227 is about ½". In another implementation, the x-direction length L is ⅜".

According to one implementation, a user can apply the compression force (e.g., F1 and F2) to bend the compressible legs 206 and 207 toward one another, as shown. While such force is applied, the compressible legs 206 and 207 can be inserted into a receiving aperture, such as a ring or grommet. In some cases, the receiving aperture may have a diameter slightly less than the x-direction width of the compressible legs 206 and 207 when under compressive stress (as shown). In such case, the compressible legs 206 and 207 can be inserted into the receiving aperture while rotated at a slight angle. When the compression force is removed, the compressible legs 206 and 207 return to a relaxed position and object walls defining the perimeter of the aperture rest about the compressible legs 206 and 207 at a z-direction position between the pair of endpoint protrusions 226 and 227 and the pair of midpoint protrusions 228 and 229. A clasping mechanism 214 can be engaged fixedly attach the clip 200 to another item (not shown).

Figure 3:
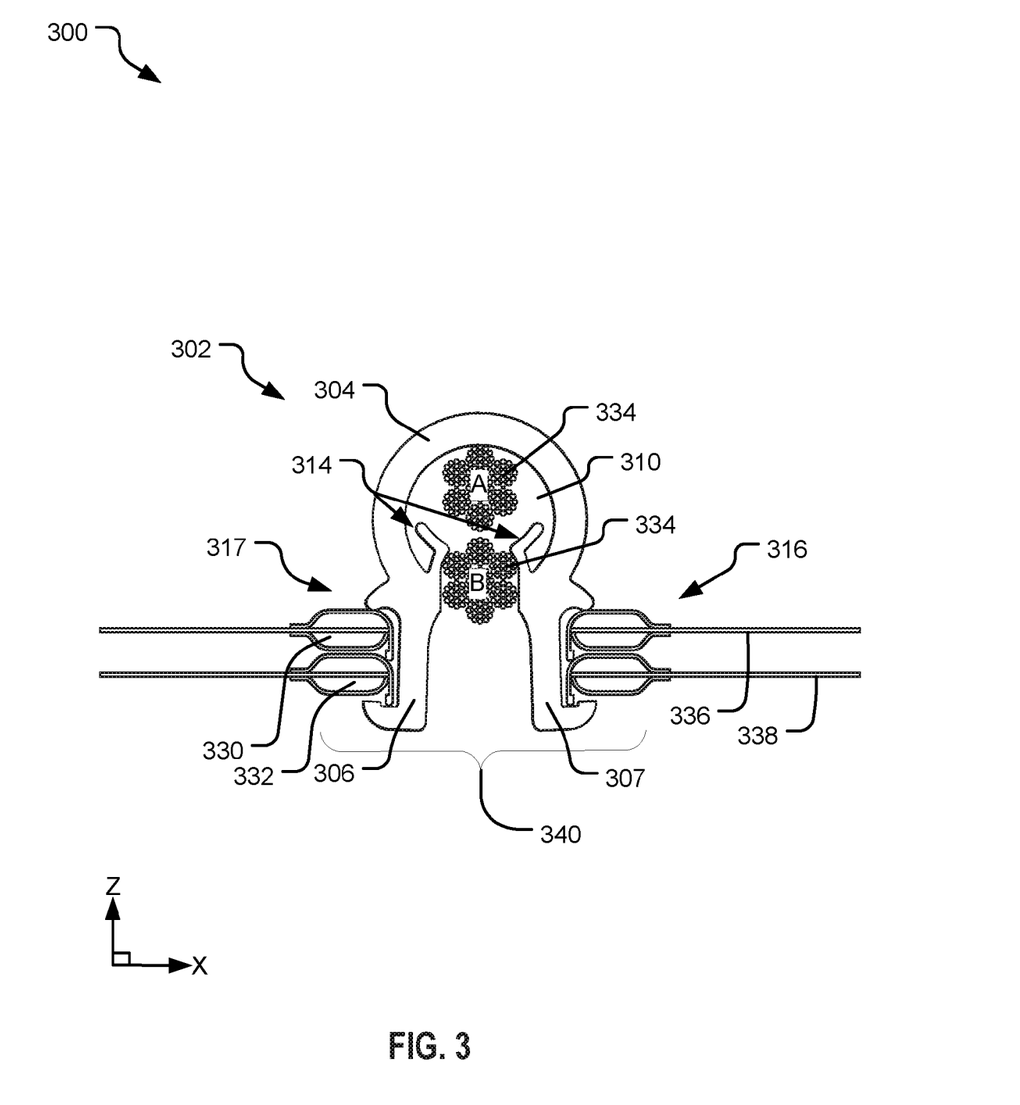
FIG. 3 illustrates dual positions of a cable relative to an example clip for securing one or more cover panels within a containment structure cover system.

FIG. 3 illustrates a cross-sectional view of a system 300 including an elongated object (e.g., a cable 334) threaded through an internal space 310 partially-enclosed by a clip 302. The cable 334 is shown in dual positions "A" and "B" within the clip 302. The position "B" represents a fixedly secure position.

The clip 302 includes compressible legs 306 and 307 inserted into an aperture of an attachment point 340. In FIG. 3, the attachment point 340 includes two stacked grommets 330 and 332, each embedded within a respective cover panel 336 or 338. In one implementation, the attachment point 340 includes an aperture formed through a single cover panel (e.g., a single grommet); in yet another implementation the relative dimensions of the clip 302 and attachment point 340 are different than those illustrated in FIG. 3, and the attachment point 340 includes an aperture formed through three or more cover panels (e.g., an aperture formed by three or more stacked grommets).

The compressible legs 306 and 307 of the clip 302 adjoin opposite ends of a central portion 304 and each includes a latching mechanism (e.g., latching mechanisms 316 and 317). By applying a force to bend the compressible legs 306 and 307 toward one another (e.g., as shown in FIG. 2), a user can insert the compressible legs 306 and 307 into the aperture of the attachment point 340. Once the compressible legs 306 and 307 are threaded through the aperture of the attachment point 340, the user can remove the applied force, allowing the compressible legs 306 and 307 to assume a relaxed position (as shown).

The clip 302 further includes a clasping mechanism 314 that can be engaged to provide a static resistance to compression of the compressible legs 306 and 307. For example, a cover panel or multiple joined cover panels (e.g., the cover panels 336 and 338) may be subject to differential, opposing, or uneven lateral forces due to uneven snow or water collecting on an outer surface of the cover panels. Without compression resistance from the cover clip 302, the differential lateral force may, in some circumstances, dislodge the clip 302 from the attachment point 340 and compromise system integrity. However, the clasping mechanism 314 can be engaged to provide a compression resistant force that prevents the compressible legs 306 and 307 from collapsing under these opposing lateral forces.

To engage the clasping mechanism 314, the cable 334 is threaded through the internal space 310, as shown at position 'A'. A force is applied to reposition the cable 334 from the position A to the position B between securing tabs of the clasping mechanism 314. At the position B, the cable 334 supplies an outward force on the compressible legs 306 and 307, effectively pressing the latching mechanisms 316 and 317 outward against the grommets 330 and 332. This outward force tightens a coupling between the clip 302 and the grommets 330 and 332, preventing the compressible legs 306 and 307 from decoupling from the grommets 330 and 332. In one implementation, the illustrated coupling between the grommets 330 and 332 and the clip 302 is capable of withstanding up to 200 pounds of sheer force.

The clip 302 can be manufactured from a variety of suitable flexible materials that are bendable under a compressive force applied by squeezing the compressible legs 306 and 307 toward one another. Suitable flexible materials are sufficiently resistant to deformation so as to resume an original shape when the compressive force is removed.

Depending on desired design criteria, the magnitude of force sufficient to bend the compressible legs 306 and 307 may vary. In one implementation, the cover clip 302 is flexible enough that it can be deformed by a human hand squeezing the compressible legs 306 and 307 toward once another. When the squeeze is released the clip 302 resumes its original shape. Suitable flexible materials for the clip 302 include without limitation Nylon plastic, ultra high molecular weight polyethylene plastic and Acetal plastic.

Depending on design criteria and application of use, the clip 302 may be of a variety of different sizes. A diameter of the internal space 310 is larger than a diameter of the cable 334. In one implementation, the cable 334 is ⅜" in diameter. In another implementation, the clip 302 has an x-direction length of approximately 1.5 inches and a z-direction height of approximately 1 and ¾ inches.

In one implementation, the clasping mechanism 314 of the clip 302 is engaged by a peg or ring rather than the cable 334. For example, the compressible legs 306 and 307 of the clip 302 may be inserted through one or more grommets (as shown) and a peg or ring may be inserted between the securing tabs of the clasping mechanism 314, effectively locking the clip 302 into place.

The clip 302 can be made using a variety of techniques, including injection molding and laser cutting. In one implementation, the clip 302 is manufactured via an injection molding process using a molten plastic resin that is pressurized into die cavities matching the shape of the finished clip 334 (e.g., as pictured). In another implementation, the clip 302 is laser cut from plastic resin sheets (e.g., ~¼-inch thick) using a computer numeric controlled laser. A variety of other manufacturing techniques are also contemplated.

Figure 4:
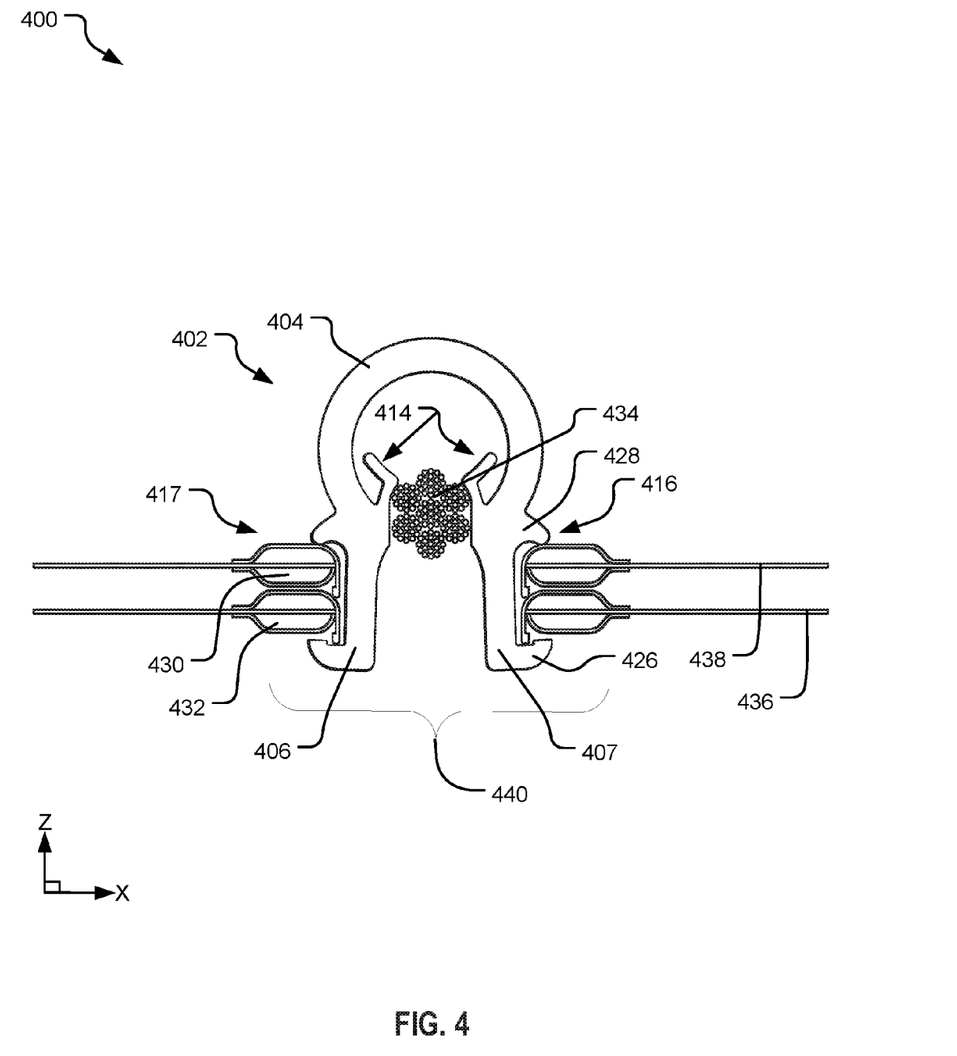
FIG. 4 illustrates a cable engaging a clasping mechanism of an example clip to secure legs of the clip within two stacked cover panels of a containment structure cover system.

FIG. 4 illustrates a cross-sectional view of a portion of a system 400 including a clip 402 secured to stacked cover panels 436 and 438. The clip 402 includes compressible legs 406 and 407 threaded through an aperture formed by two stacked grommets 430 and 432. Each of the grommets 430 and 432 is embedded within one of the cover panels 436 and 438.

The clip 402 includes compressible legs 406 and 407 that each adjoins opposite ends of a central portion 404. Further, the compressible legs 406 and 407 include a latching mechanism (e.g., latching mechanisms 416 and 417, respectively) on an outward-facing surface of the clip 402. Each latching mechanism further includes an endpoint protrusion (e.g., an endpoint protrusion 426) and a midpoint protrusion (e.g., a midpoint protrusion 428) separated by a distance along a length of the corresponding compressible leg 406 or 407.

The clip 402 further includes a clasping mechanism 414 having a pair of securing tabs sized and separated so as to receive a cable 434 in space between them. When the cable 434 is engaged between the securing tabs (as shown), the cable 434 supplies an outward force against the compressible legs 406 and 407, effectively pressing the latching mechanisms 416 and 417 outward against an interior lip of the grommets 430 and 432. This outward force tightens a coupling between the clip 402 and the grommets 430 and 432, significantly increasing the magnitude of force needed to disengage the grommets 430 or 432 from the compressible legs 406 and 407.

In one implementation, the containment structure cover system 400 includes multiple panels designed to float or rest atop a volume within a containment structure. The panels are positioned within the containment structure such that a number of attachment points (e.g., such as the attachment point 440) are positioned to encircle a common axis. A number of clips, such as the clip 402, are securely fastened at each of the attachment points in a manner the same or substantially similar to that illustrated in FIGS. 3 and 4. The cable 434 is threaded through each of the clips (e.g., as shown), and positioned to engage a clasping mechanism (e.g., the clasping mechanism 414) of each of the clips. In this manner, panels associated with each attachment point are prevented from shifting relative to one another, and the cable 434 is also locked into a stationary position relative to each cover panel.

Figure 5:
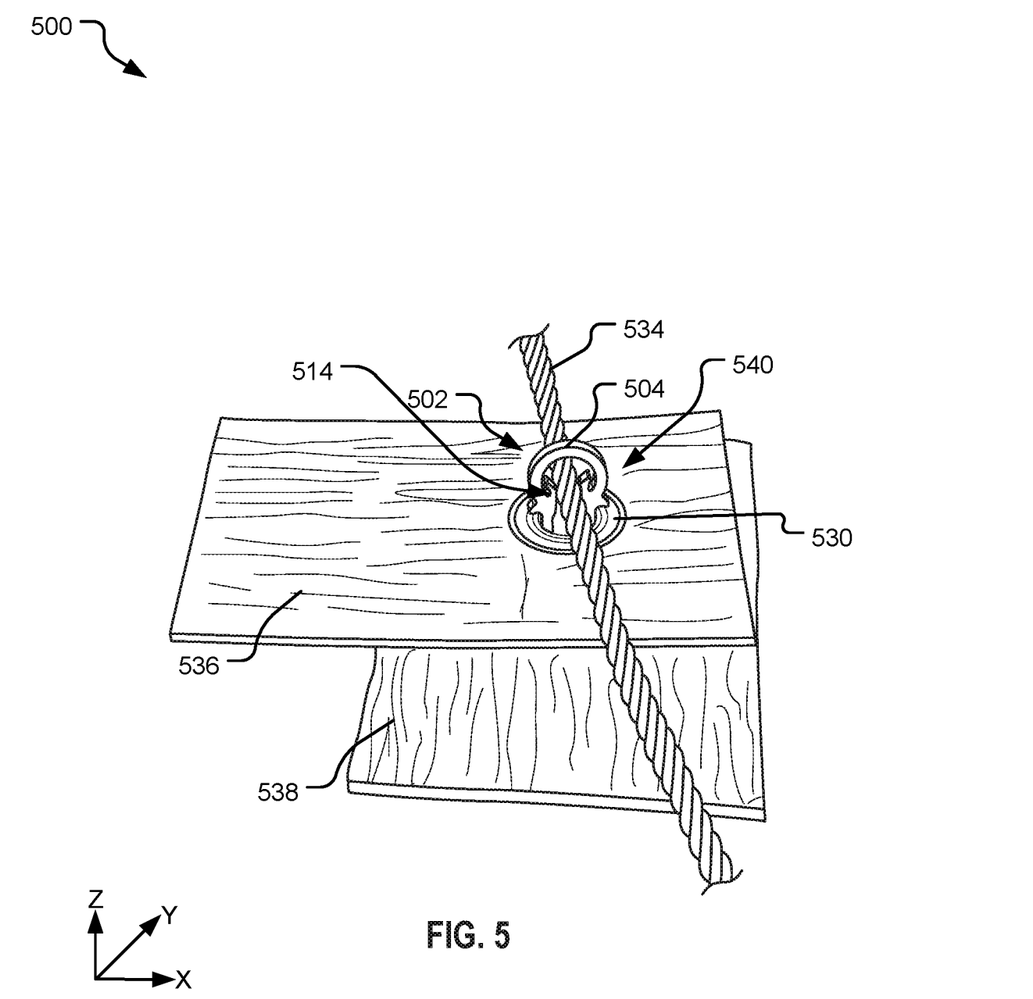
FIG. 5 illustrates an example containment structure cover system including a clip that securely fastens one or more cover panels to a cable at an attachment point.

FIG. 5 illustrates a portion of an example containment structure cover system 500 including a clip 502 that securely fastens cover panels 536 and 538 to a cable 534 at an attachment point 540. In one implementation, the cover panels 536 and 538 are used in combination with a number of other cover panels to conceal and/or protect a volume within a containment structure. For example, the cover panels 536 and 538 may provide insulation to contents of the containment structure, prevent contents of the containment structure from escaping, prevent moisture and other substances from seeping into the containment structure, etc. In one implementation, the cover panels 536 and 538 are adapted to float on a surface of liquid stored within a containment structure.

The clip 502 includes compressible legs (not shown), which are threaded through an aperture formed by two stacked grommets including grommet 530 and an underlying grommet (not shown). Each of the stacked grommets are embedded within a cover panel (e.g., cover panels 536 and 538, respectively). The compressible legs each adjoin to an opposite end of a central portion 504.

A clasping mechanism 514 includes a pair of securing tabs that protrude from the central portion 504 into a space partially enclosed by the central portion 504. The securing tabs are sized and separated so as to receive and securely clasp a cable 534 in a space between them. When the cable 534 is engaged between the securing tabs (as shown), the cable 534 supplies an outward force against the compressible legs. This outward force effectively tightens a coupling between the clip 502 and any grommets (e.g., a grommet 530) or other structures encircling the compressible legs.

In one example containment structure cover system, a cover includes a number of different cover panels that each includes one or more apertures usable as attachment points for a number of clips (such as the clip 502). The clips are used to secure different sets of two or more cover panels together (e.g., as illustrated). The cable 534 is threaded through each of the clips. In this manner, multiple cover panels can be secured relative to one another and along the same cable. This may prevent shifting of the panels relative to one another and also prevent displacement of one or more panels due to wind uplift. In another implementation, the clip 502 or a clip including features similar to the clip 502 is used to secure one or more cover panels to the perimeter of a containment structure (not shown).

In one implementation where the cable 534 is sufficiently taught, the cable 534 secures cover panels at a common height within a storage tank. If the cable 534 is also sufficiently heavy, the cable 534 may weigh down one or more cover panels so that they cannot be displaced (e.g., flipped up) by wind gusts. For instance, the cable 534 may cause a controlled, localized linear depression on top of a cover panel, within a joint between multiple cover panels, and/or around a perimeter edge of a containment structure cover. This localized linear depression could submerge the underlying cover panel(s) in a liquid stored within the storage tank, thus eliminating an otherwise exposed edge that could be uplifted by wind.

Figure 6:
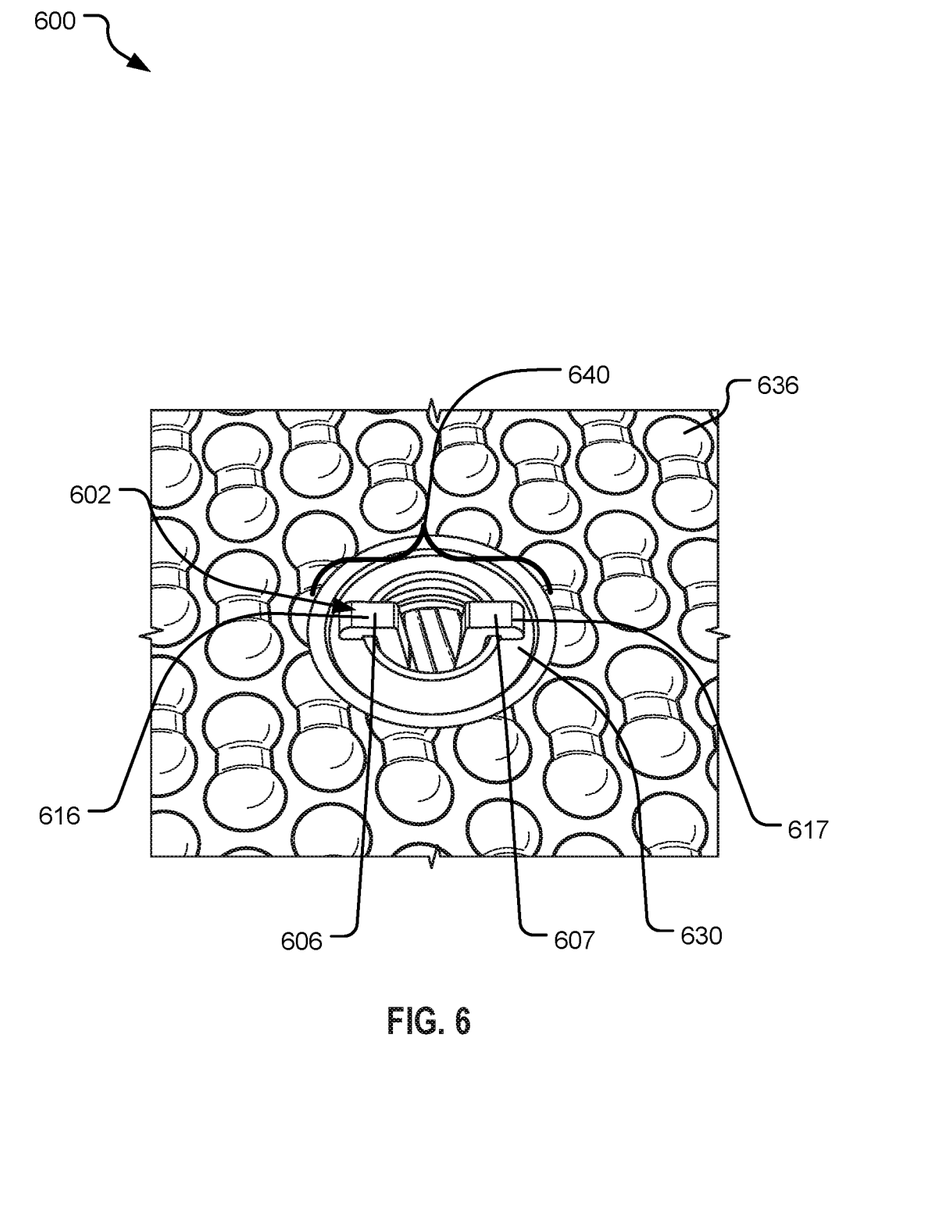
FIG. 6 illustrates a bottom view of a containment structure cover system including an example clip with compressible legs secured to an attachment point of a cover panel.

FIG. 6 illustrates a bottom view of an example containment structure cover system 600 including an example clip 602 with compressible legs 606 and 607 secured to an attachment point 640 of one or more cover panels (e.g., a cover panel 636). The compressible legs 606 and 607 are threaded through an aperture formed by at least one grommet 630. In some implementations, the clip attaches to a single grommet; in other implementations, the clip 602 attaches to multiple stacked grommets. In still other implementations, the attachment point 640 includes reinforced holes or other structures in place of grommet(s).

The compressible legs 606 and 607 each include latching mechanisms 616 and 617. The latching mechanisms 616 and 617 each rest against a surface of the secured grommet 630 (as shown).

Figure 7:
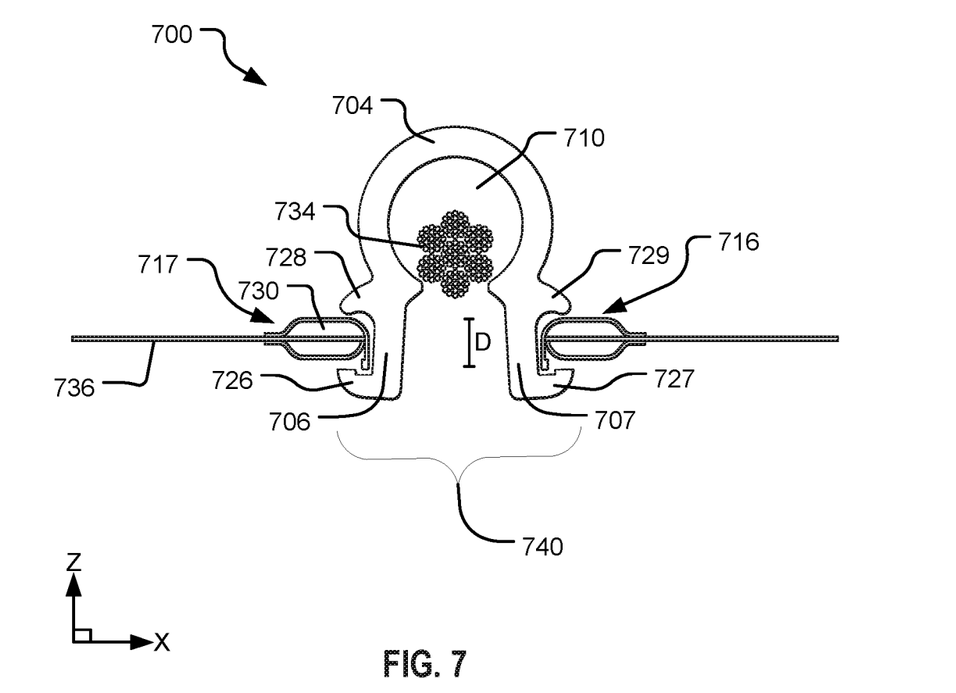
FIG. 7 illustrates another example clip for securing one or more cover panels of a containment structure cover system.

FIG. 7 illustrates a cross-sectional view of another example clip 700 secured to an attachment point 740 in a single cover panel 736. The clip 700 includes compressible legs 706 and 707, which are threaded through an aperture in a grommet 730 that is embedded in the cover panel 736. The compressible legs 706 and 707 each adjoin opposite ends of a central portion 704 and include a latching mechanism (e.g., latching mechanisms 716 and 717, respectively) on an outward-facing surface of the clip 700. Each latching mechanism further includes an endpoint protrusion (e.g., endpoint protrusions 726 and 727) and a midpoint protrusion (e.g., midpoint protrusions 728 and 729) separated by a distance 'D' along a length of the corresponding compressible leg 706 or 707. In one implementation, the distance 'D' is equal or slightly greater than of an inch to accommodate placement of a grommet (e.g., the grommet 730) of comparable z-direction height (e.g., about ¼") around the compressible legs 706 and 707. A cable 734 is threaded through an internal space 710 partially-enclosed by the central portion 704. Unlike other implementations disclosed herein, the clip 700 does not include a clasping mechanism within the internal space 710.

In one implementation, the clip 700 and cable 734 are sized such that the cable 734 can slide back and forth through the clip 700. In this system, the cover panel 736 can slide laterally on top of a volume within a containment structure along a length of the cable 734. If the cable is curved around a perimeter of the containment structure, the cover panel 736 may rotate around the perimeter and along the cable 734. Further, if the cable 734 is positioned to weigh down a perimeter edge of the cover panel 736, the cover panel 736 is effectively prevented from flipping up under the force of wind.

Figure 8:
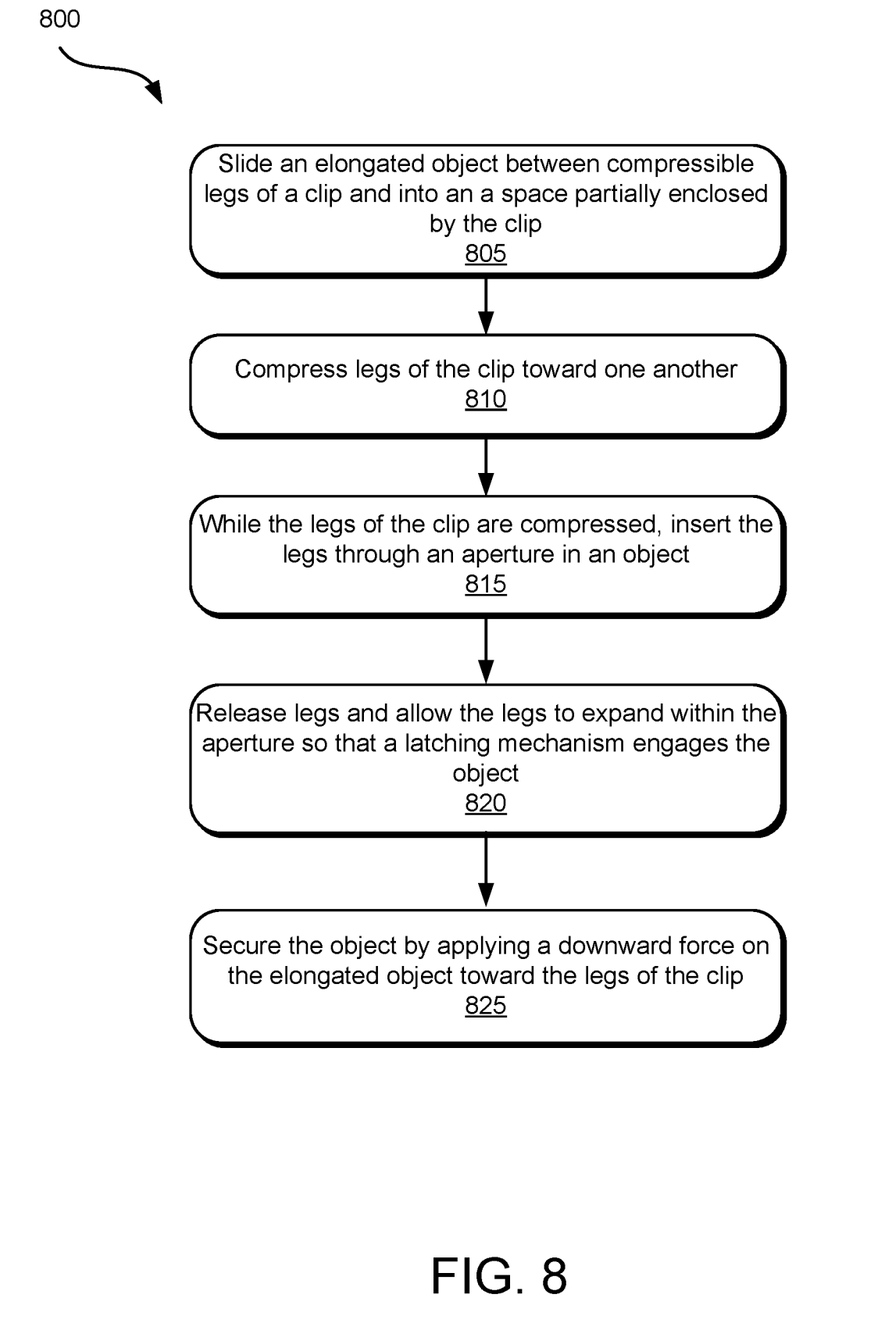
FIG. 8 illustrates example operations for securing cover panels in an example cover system.

FIG. 8 illustrates example operations 800 for securing cover panels in an example cover system. An insertion operation 805 inserts a cable or other elongated object (e.g., a rope, wire, cable, bungee, webbing, etc.) between compressible legs of a clip and into an annular-shaped space partially-enclosed by the clip. A compressing operation 810 applies a compressive force to reduce a distance between the compressible legs. While the compressive force is applied, another insertion operation 815 inserts the compressible legs of the cover clip into an aperture of another object, such as a grommet, reinforced hole, cut-out, etc.

A release operation 820 releases the compressive force on the compressible legs of the clip, allowing the compressible legs to expand away from one another and rest adjacent to an internal rim of an object including the aperture (e.g., a grommet). In one implementation, the object encircles the compressible legs at a vertical (z-direction) position between each of two protrusions formed on each of the compressible legs. In the absence of applied force, the space between corresponding protrusions (e.g., between two endpoint protrusions or between two midpoint protrusions) is smaller than the diameter of the aperture so as to provide upper and lower "stops" that prevent the clip from slidably disengaging from the object.

A securing operation 825 supplies a securing force to further secure the clip within the grommet. In one implementation, the securing operation 825 applies a force to engage the cable or other elongated object within a clasp mechanism of the clip. For example, the securing operation 825 may position the cable or other elongated object snugly between two securing flanges extending from opposite sides of the clip into the partially-enclosed space. After application of the securing force, the cable or elongated object rests snugly between the securing tabs, supplying an outward force against the compressible legs.

It should be understood that the above-described operations 800 may be performed in any order, adding and omitting operations as desired, unless explicitly claimed otherwise or a specific order is inherently necessitated by the claim language.

The above specification and examples, together with the attached appendix, provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A clip comprising:
   a curved central portion forming a perimeter that partially-encloses an internal space with a first diameter, the curved central portion having a first and second ends;
   a neck portion including a first side with an upper end adjoining the first end of the curved central portion and a second side with an upper end adjoining a second end of the curved central portion, the first side separated from the second side by a distance smaller than the first diameter that provides a channel to the internal space; and
   a first compressible leg adjoining a lower end of the first side of the neck portion and a second compressible leg adjoining a lower end of the second side of the neck portion, wherein the first compressible leg and the second compressible leg each include a midpoint protrusion adjacent to the neck portion and on an outward-facing surface and an endpoint protrusion distal to the neck portion and on the outward-facing surface, the endpoint protrusion longer than the midpoint protrusion, wherein the clip has a longest dimension defined along an axis substantially perpendicular to a primary axis of the endpoint protrusions.

2. The clip of claim 1, wherein the endpoint protrusion angles toward the midpoint protrusion.

3. The clip of claim 1, wherein the midpoint protrusion angles toward the endpoint protrusion.

4. The clip of claim 1, wherein the endpoint protrusion and the midpoint protrusion angle toward one another.

5. The clip of claim 1, further comprising a clasp extending from the neck portion and including first and second securing tabs that each have a free end protruding into the internal space.

6. The clip of claim 5, wherein the free ends of the first and second securing tabs rest adjacent to opposite sides of an object when the clasp is engaged.

7. The clip of claim 1, wherein the central portion is annular.

8. The clip of claim 1, wherein the first compressible leg and the second compressible leg are sized and shaped for insertion into a grommet when placed under a compressive force.

9. The clip of claim 8, wherein the first compressible leg and the second compressible leg are substantially parallel to one another when the first compressible leg and the second compressible leg are secured against the grommet.

10. A method comprising:
applying force to compress two legs of a clip toward one another, the clip including:
a curved central portion forming a perimeter that partially-encloses an internal space with a first diameter, the curved central portion having a first and second ends;
a neck portion including a first side with an upper end adjoining the first end of the curved central portion and a second side with an upper end adjoining a second end of the curved central portion, the first side separated from the second side by a distance smaller than the first diameter that provides a channel to the internal space; and
a first compressible leg adjoining a lower end of the first side of the neck portion and a second compressible leg adjoining a lower end of the second side of the neck portion, wherein the first compressible leg and the second compressible leg each include a midpoint protrusion adjacent to the neck portion and on an outward-facing surface and an endpoint protrusion distal to the neck portion and on the outward-facing surface, the endpoint protrusion longer than the midpoint protrusion, and wherein the clip has a longest dimension defined along an axis substantially perpendicular to a primary axis of the endpoint protrusions;
positioning an object to extend through the internal space; and
applying a force to the object in a direction toward the first compressible leg and the second compressible leg to fixedly secure the object within the channel to the internal space while the object supplies an outward force on the first compressible leg and on the second compressible leg.

11. The method of claim 10, wherein the endpoint protrusion angles toward the midpoint protrusion.

12. The method of claim 10, wherein the midpoint protrusion angles toward the endpoint protrusion.

13. The method of claim 10, wherein the midpoint protrusion and the endpoint protrusion angle toward one another.

14. The method of claim 10, wherein the first compressible leg and the second compressible leg are sized and shaped for insertion into a grommet when placed under a compressive force.

15. The method of claim 14, wherein the first compressible leg and the second compressible leg are substantially parallel to one another when the first compressible leg and the second compressible leg are secured against the grommet.

16. The method of claim 10, wherein the curved central portion has an annular shape.

17. A clip including:
a curved central portion sized to receive a cable and forming a perimeter that partially-encloses an internal space with a first diameter, the curved central portion having a first and second ends;
a neck portion including a first side with an upper end adjoining the first end of the curved central portion and a second side with an upper end adjoining a second end of the curved central portion, the first side separated from the second side by a distance smaller than the first diameter that provides a channel to the internal space; and
a first compressible leg adjoining a lower end of the first side of the neck portion and a second compressible leg adjoining a lower end of the second side of the neck portion, wherein the first compressible leg and the second compressible leg each include a midpoint protrusion adjacent to the neck portion and on an outward-facing surface and an endpoint protrusion distal to the neck portion and on the outward-facing surface, the endpoint protrusion longer than the midpoint protrusion, wherein the clip has a longest dimension defined along an axis substantially perpendicular to a primary axis of the endpoint protrusions.

18. The clip of claim 17, wherein the endpoint protrusion angles toward the midpoint protrusion.

19. The clip of claim 17, wherein the midpoint protrusion angles toward the endpoint protrusion.

20. The clip of claim 17, wherein the midpoint protrusion and the endpoint protrusion angle toward one another.

* * * * *